INVENTOR.
William C. Gleisner Jr.

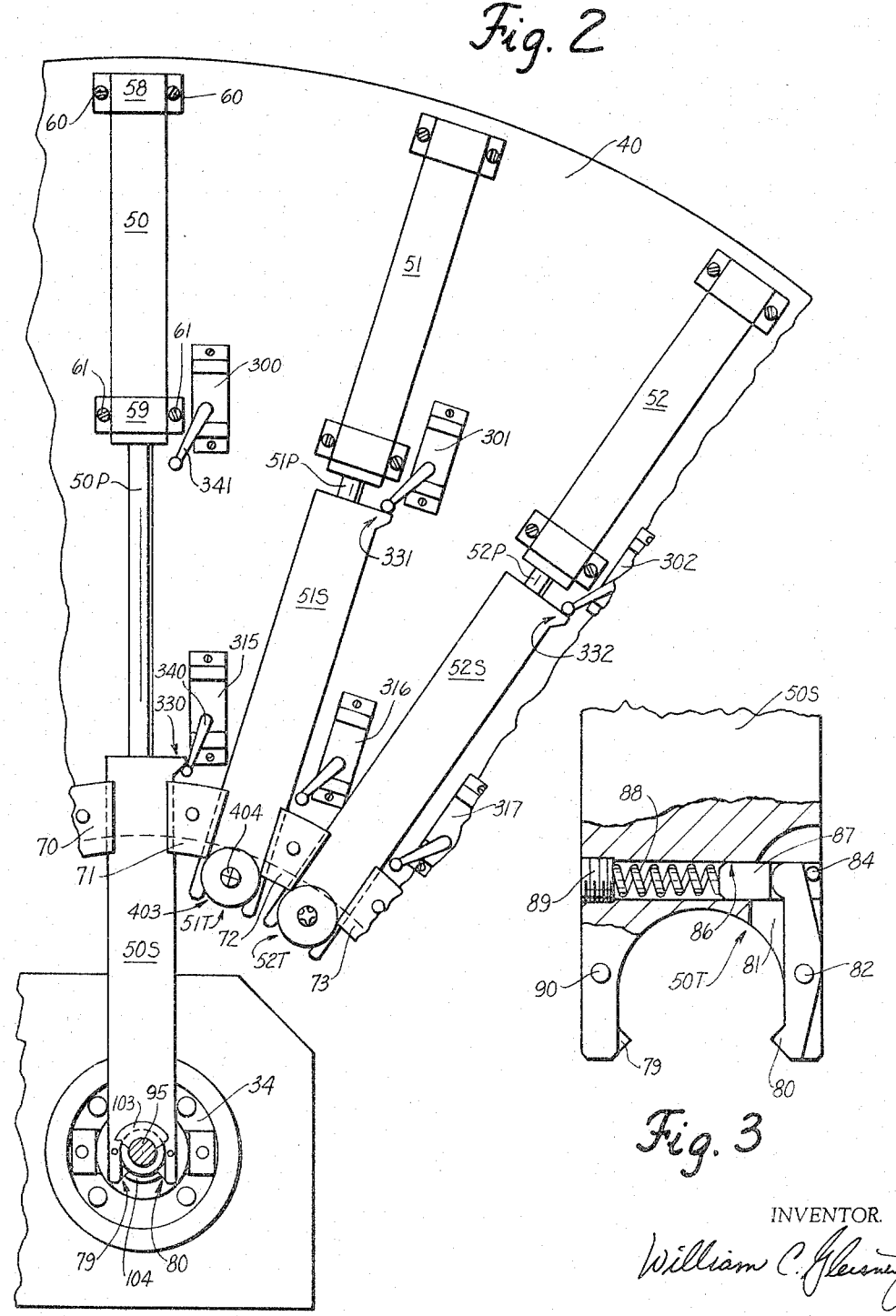

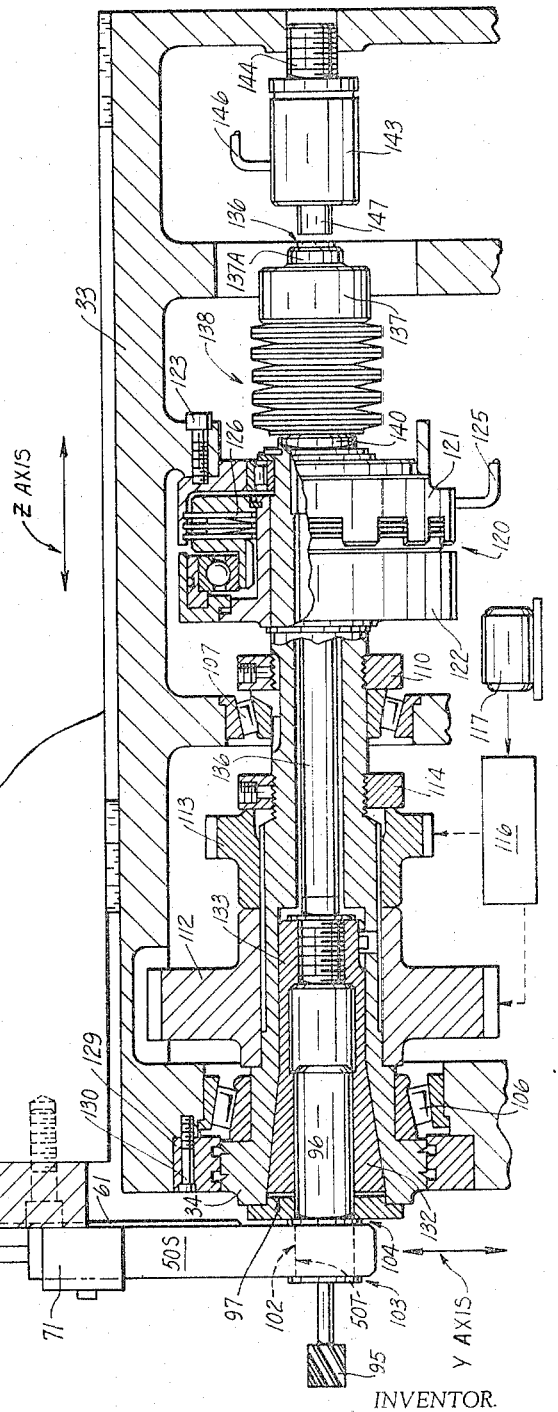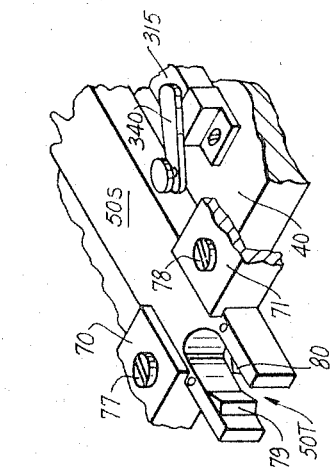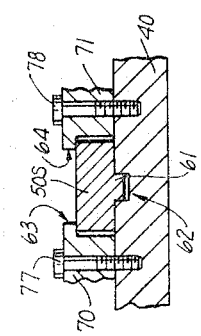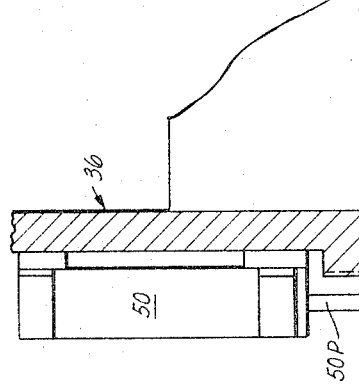

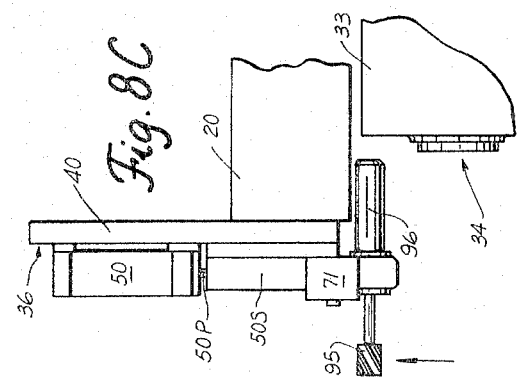
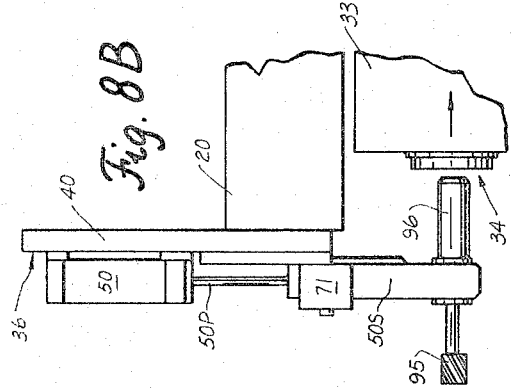
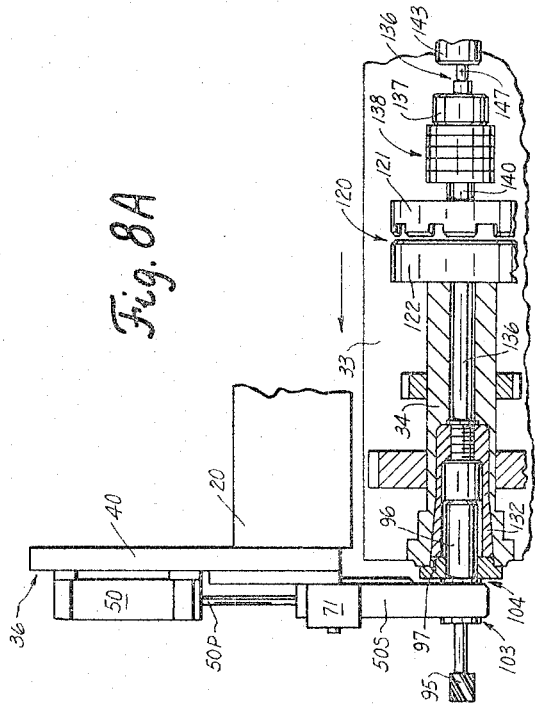
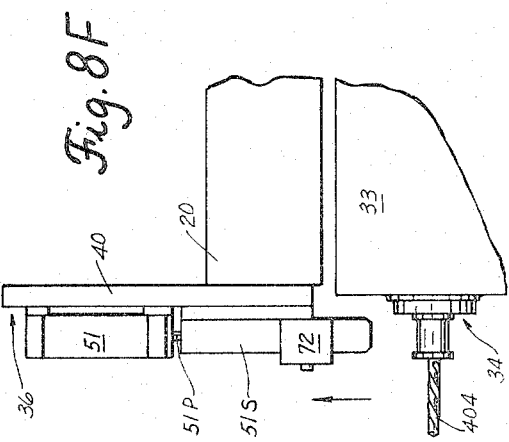
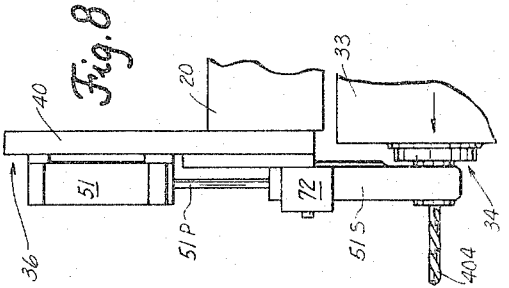
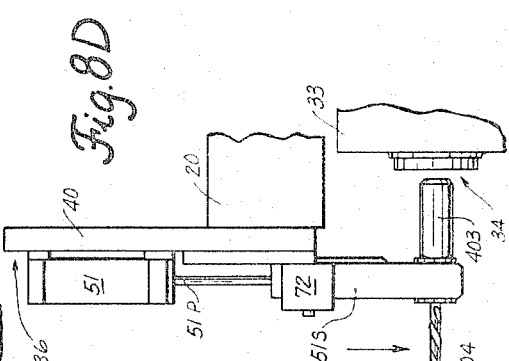

INVENTOR.
William C. Gleisner Jr.

United States Patent Office 3,298,098
Patented Jan. 17, 1967

3,298,098
MACHINE TOOL WITH TOOL CHANGER
William C. Gleisner, Jr., Milwaukee, Wis., assignor to Kearney & Trecker Corporation, West Allis, Wis., a corporation of Wisconsin
Filed Nov. 23, 1964, Ser. No. 413,229
8 Claims. (Cl. 29—568)

This invention relates generally to machine tools and more particularly to a machine tool incorporating simplified tool changing means operative to insert a selected tool into the power driven spindle thereof.

Although the prior art illustrates tool changing in a machine tool, a separate indexable tool storage magazine has been required to releasably support the tools to be interchanged. Prior to effecting a tool change, therefore, it has been necessary to identify the location of a particular tool in the magazine and then move the magazine to position the selected tool into a tool change ready position. After the storage magazine had been so moved, the selected tool was then located in predetermined tool changing relationship to a tool receiving spindle. After this, a single tool changing mechanism located in proximity to the tool change position was translationally moved to transfer the preselected tool from the storage magazine into operative engagement with the tool spindle. In coordinated relationship with this operation, the tool change mechanism also was operative to transfer the tool that had been in the tool spindle into a storage position in the storage magazine.

A principal object of the present invention is to provide a simplified tool changing machine tool.

Another object of the invention is to provide a tool changing machine that obviates the necessity for an independent, indexable tool storage magazine.

Another object is to provide a tool changing machine tool that obviates the necessity for both an indexable tool storage magazine per se and a common tool change mechanism per se.

Another object of the invention is to provide a tool changing machine tool having simplified tool storage means of unitary, modular construction.

A further object is to provide simplified tool storage means comprising a plurality of identical, separate tool supports that are respectively and selectively movable to transfer a preselected tool into operative engagement with a cooperatively disposed tool receiving spindle.

A still further object of the invention is to provide tool storage means comprising a plurality of identically configured tool supports respectively carried for individual movement from a retracted storage position to transfer a tool carried thereby to a tool spindle.

According to this invention, a machine tool is provided with a movable tool receiving spindle adapted to successively receive different selected cutting tools for performing different machining operations. To accomplish this, there is provided a combined unitary tool storage and tool change means having a plurality of independent, separately movable tool storage supports carried in spaced relationship relative to the tool receiving spindle. Selectively releasable tool securing means are associated with each of the tool supports in a manner that a plurality of tools are carried thereby in a normally retracted storage position. In preparation for a tool change, an empty one of the storage supports is moved in coordinated relationship with the tool securing means carried thereby to remove a previously used tool from the spindle and return it to storage position. Sequentially thereafter, a different preselected one of the tool supports is moved to operatively insert the tool carried thereby into operative position in the spindle for movement therewith to perform the next required machining operation.

The foregoing and other objects of this invention which will become more fully apparent from the following detailed description, may be achieved by means of the exemplifying apparatus set forth in the specification in connection with the accompanying drawings, in which:

FIG. 2 is an enlarged fragmentary view in front elevation of several of the individual tool supports in association with the tool spindle moved into a predetermined axially selected tool change position;

FIG. 3 is an enlarged fragmentary view of a tool support, with certain parts broken away to illustrate the releasable tool securing means;

FIG. 4 is an enlarged fragmentary view, partly in side elevation and partly in vertical section illustrating the releasable tool securing spindle collet;

FIG. 5 is an enlarged fragmentary view of the guide means for an individual tool support;

FIG. 6 is an enlarged fragmentary view in perspective of a tool support and the associated guide means therefor;

Figure 9:
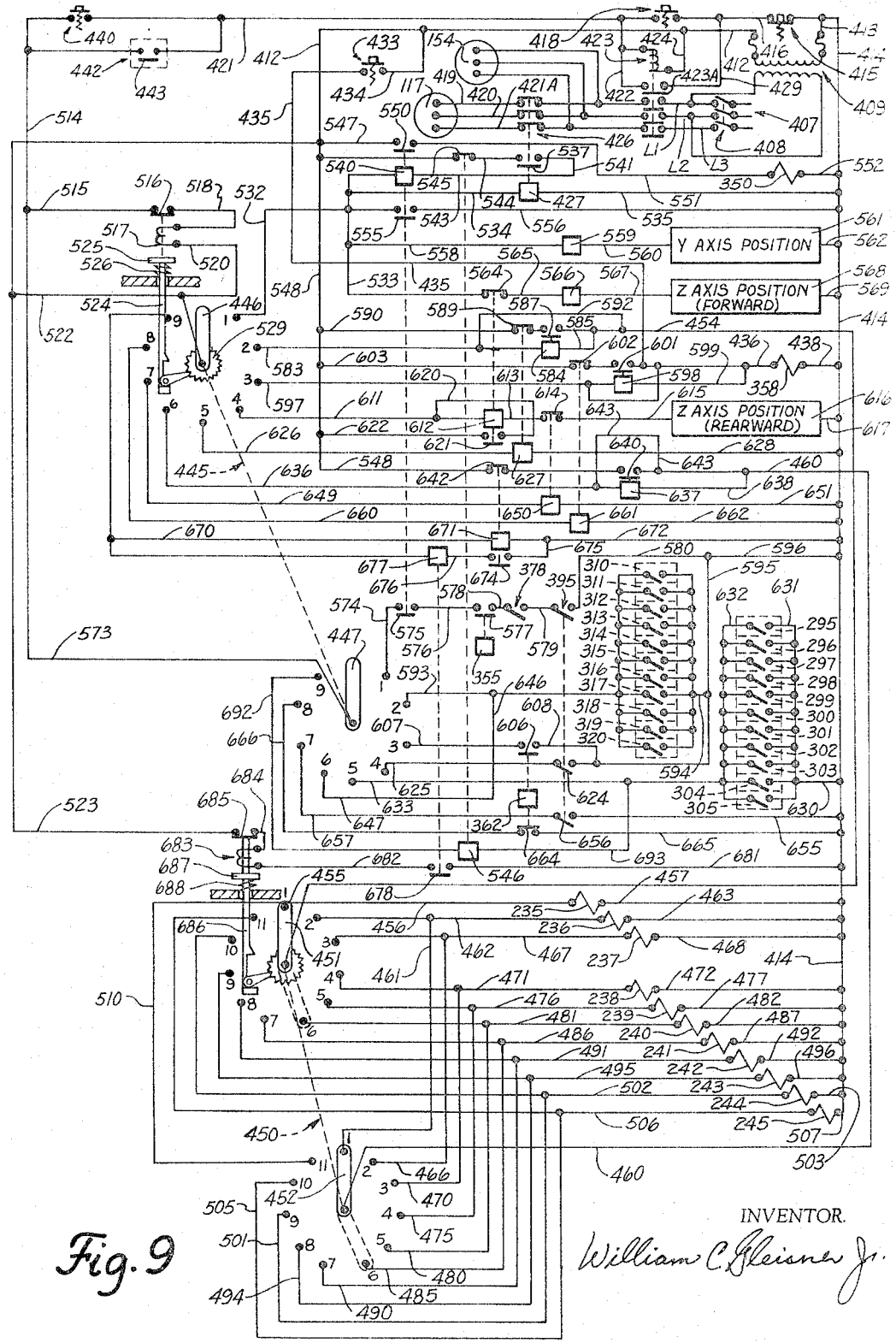
Figure 10:
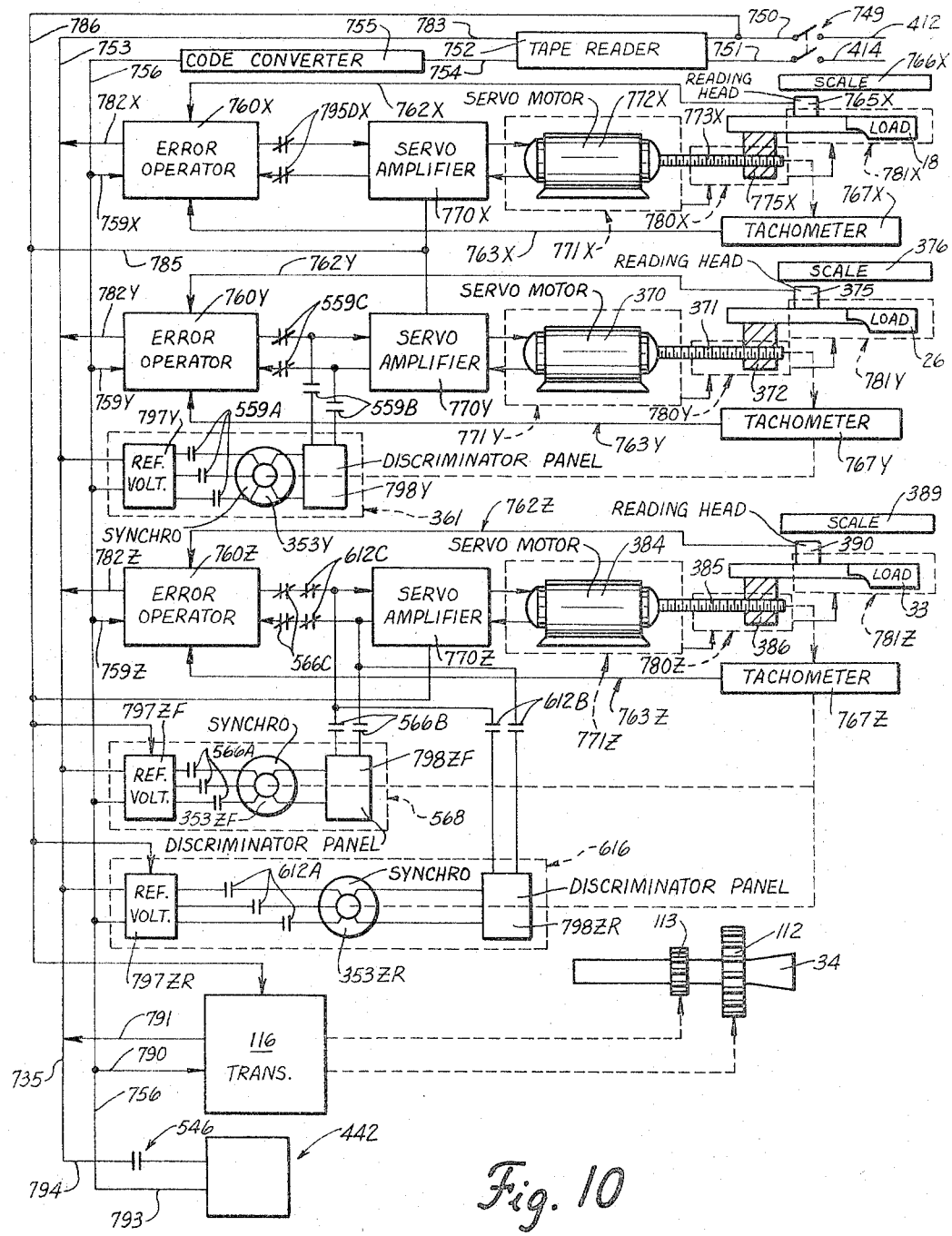

FIGS. 8A to 8F inclusive are fragmentary schematic views illustrating selective movements that occur during an interchange of tools between the combined unitary tool storage means and the tool spindle;

FIG. 9 is a schematic electrical circuit diagram for effecting a tool change operation; and, FIG. 10 is a diagrammatic block diagram of a preferred form of numerical control system for effecting machine movements.

Figure 1:
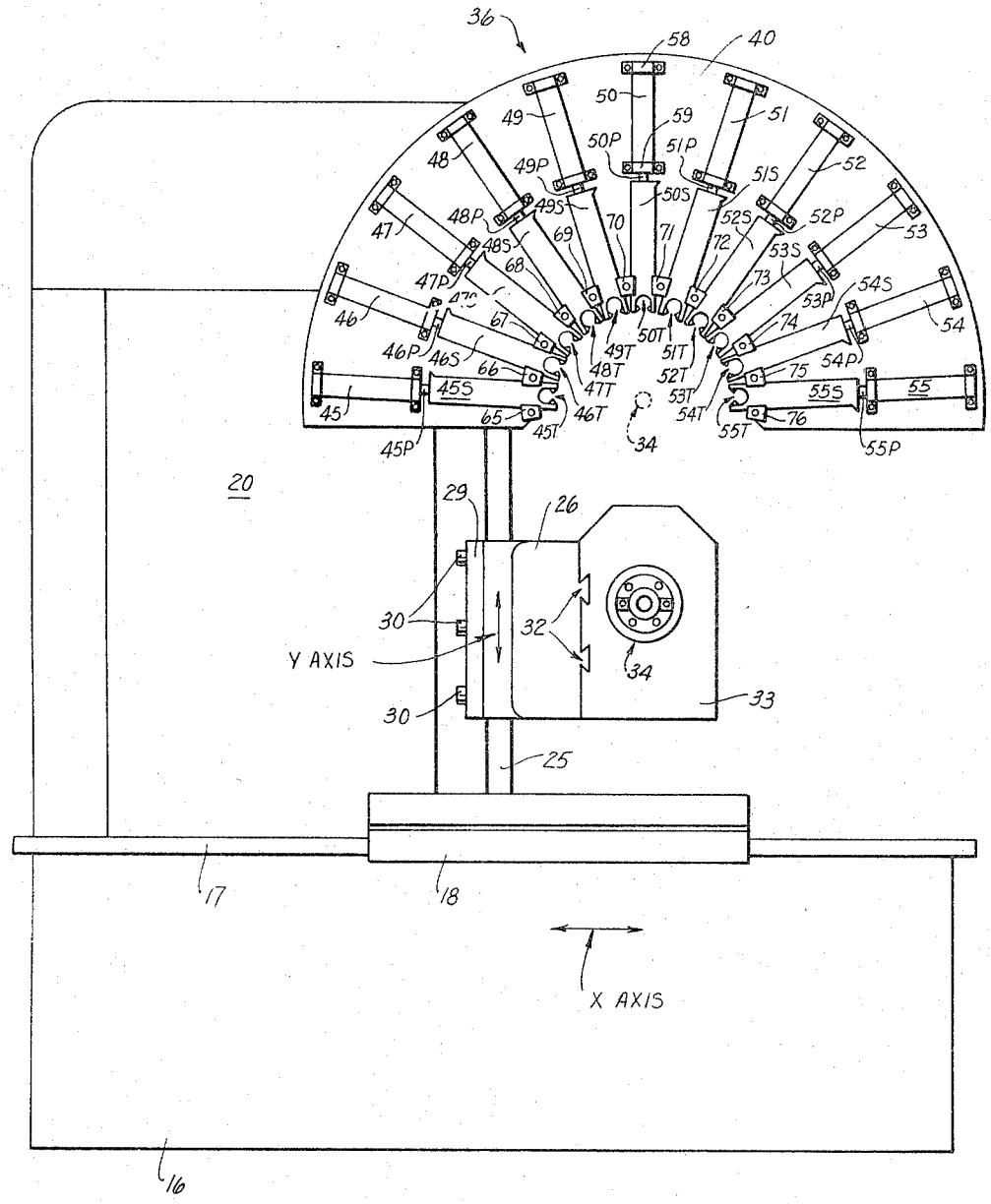
FIGURE 1 is a view in front elevation of a machine tool incorporating the features of the present invention.

Referring now to the drawings and particularly FIG. 1, there is shown a machine tool incorporating a preferred embodiment of the present invention. The machine comprises a supporting base or bed 16 provided with longitudinally extending guideways 17 adapted to slidably support a work supporting table 18 for longitudinal movement.

At its rearward face, the bed 16 is fixedly secured to a vertically upstanding machine column 20 and cooperates therewith to constitute a stationary, rigid supporting frame for the various machine members that are carried for movement relative to the worktable 18. At its rightward side, the vertical column 20 is provided with a pair of vertically extending front and rear, flanged guideways. Inasmuch as this construction is well known in the machine tool art, only the front flanged guideway 25 is shown in FIG. 1. The rear vertical column guideway (not shown) and the parallel front vertical column guideway 25 are disposed to support a saddle 26 for selective vertical movement relative to the longitudinally movable worktable 18. The usual gibs are secured to spaced apart rearwardly extending portions of the saddle 26 for maintaining it in guidable engagement with the flanged ways presented by the vertical column 20. As illustrated in FIG. 1, a gib 29 is secured to the saddle 26 by means of cap screws 30 to maintain the saddle in slidable engagement with the flanged column guideway 25.

In a similar manner, the saddle 26 is provided with horizontally disposed, transverse guideways 32, adapted to slidably engage complementary guideways presented by a spindle supporting head 33. A tool spindle 34 is journalled within the spindle head 33 for rotation about a horizontal axis. The usual gibs (not shown) are provided to retain the spindle head 33 in slidable engagement with the saddle 26, and for retaining the worktable 18 in slidable engagement with the machine bed 16. By means of this arrangement, a cutter carried by the tool spindle 34 and a workpiece mounted upon the worktable 18 are relatively movable along three mutually perpendicular axes. As shown in FIG. 1, the worktable 18 is carried by the bed 16 for movement along an X axis, and the saddle 26 is movable along a Y axis for moving the tool spindle 34 in a corresponding direction. Further, as represented in FIG. 4, the tool spindle 34 is movable along a Z axis whenever the spindle head 33 is moved in a horizontal plane relative to the supporting saddle 26.

At its upper end, the vertical column 20 is adapted to support a combined, unitary tool storage and tool interchange means 36 in vertically spaced relationship above the vertically movable spindle head 33. At the start of a tool change cycle, it is necessary to move the saddle 26 upwardly as well as position the spindle head 33 horizontally therealong. The purpose of this is to move the tool spindle 34 to the phantom line axially positioned tool change station, as illustrated in FIG. 1, with respect to the unitary tool storage and tool interchange means 36.

The combined tool storage and interchange means 36 comprises essentially a semi-circular, stationary support plate 40 that is secured directly to the upper portion of the column 20 by means of cap screws 40A, as shown in FIG. 4. To the front face of the support plate 40, there are secured a plurality of separate, actuating cylinders 45 to 55 inclusive. As shown in FIGS. 1 and 2, the actuating cylinder 50 is secured to the front face of the support plate 40 by means of a pair of spaced apart clamp brackets 58 and 59 that are affixed directly to the support plate by means of cap screws, such as the cap screws 60 and 61. The other cylinders are affixed to the support plate 40 in like manner to that described for the cylinder 50. Whenever the tool spindle 34 is moved vertically upward to the axially predetermined tool change position indicated by the phantom lines in FIG. 1, it will be apparent that the actuating cylinders 45 to 55 inclusive are positioned in radially spaced relationship thereto. Each of the actuating cylinders is provided with normally retracted piston rods 45P to 55P inclusive that are in turn secured to the inner ends of individual tool supports 45S to 55S inclusive.

To support the individual tool supports 45S to 55S inclusive for selective, radially extensible movement, there are provided stationary, flanged guides 65 to 76 inclusive, the latter being secured directly to the support plate 40. The arrangement is such that each of the tool supports is guided for radial extensible movement by an adjacent pair of the stationary flanged guides. As shown in FIGS. 1 and 2, for example, the stationary flanged guides 70 and 71 are disposed to slidably engage the tool support 50S. In FIG. 1, the tool support 50S is represented as being engaged by the guides 70 and 71 in its retracted or tool storage position. Conversely, as shown in FIG. 2, whenever the cylinder 50 is actuated to effect extensible movement of the piston rod 50P, the corresponding tool support 50S is engaged by the cooperating guides 70 and 71 as it is extended to the limit of its radial movement for interchanging a tool with the spindle 34.

As shown in FIGS. 5 and 6, the guides 70 and 71 are secured to the support plate 40 by cap screws 77 and 78. Each of the guides 70 and 71 is provided with inwardly extending flanged guideways 63 and 64 disposed to partially overlie the tool support 50S for slidably guiding it rectilinearly in its radial path of movement. Further, the tool support is provided along its inner face with an integrally formed guide 61 slidably constrained within a complementary slotted guideway 62 radially formed in the support plate 40. The other radially movable tool supports are guided for rectilinear movement in a manner identical to that hereinbefore described for the tool support 50S, and as depicted in FIGS. 5 and 6.

At their outer ends, each of the radially movable tool supports 45S to 55S is provided with a semi-circular tool receiving opening together with associated tool securing means. The arrangement is such that the semi-circular opening in each tool support is adapted to receive and grip the flanged shank of a toolholder.

As represented in the enlarged fragmentary view, FIG. 3, the tool support 50S is provided with the semi-circular tool receiving opening 50T and tool securing means comprising the inwardly extending releasable tool engaging latches 79 and 80. As shown in FIG. 3, the tool support 50S is provided toward its lower outer end with a longitudinal slot 81 within which the latch 80 is supported for limited pivotal movement. Toward its central portion, the latch 80 is carried for limited rotatable movement by a pivot pin 82 that, in turn, is fixedly secured at its opposite ends to the tool support 50S at either side of the slot 81. Whenever no tool is gripped within the semi-circular opening 50T of the support 50S, the upper end of the tool latch 80 is resiliently biased laterally outward into engagement with a stop pin 84 carried by the support arm. For actuating the latch 80, the slot 81 opens into a transverse bored opening 86 in the support that carries a slidable actuating plug 87 in position to abut the upper, inner end of the pivotal latch 80. A spring 88 within the bored opening 86 is seated at one end against a screw 89 in a manner to urge the plug 87 into engagement with the upper end of the latch 80 for normally maintaining it in engagement with the stop pin 84. The stop pin 84 limits pivotal movement of the tool engaging latch 80 only when the semicircular tool-receiving opening 50T is empty, i.e. does not contain a tool.

It will be apparent that movement of a tool either into or out of the semi-circular opening 50T will effect counterclockwise pivotal movement of the latch 80 in opposition to the latching spring 88. The other tool securing latch 79 is pivotably supported by a pivot pin 90 in like manner, and is likewise provided with both resiliently biased actuating means and pivot stop means (not shown). Inasmuch as the general configuration and mode of operation of the latch 79 is identical to that of latch 80, it is deemed sufficient to state that both of the latches 79 and 80 are pivoted laterally outward as the tool support 50S is moved into engagement with a flanged toolholder. After a tool is fully engaged, the latch 80 is resiliently urged to pivot in a clockwise direction, and the latch 79 is resiliently urged to pivot in a counterclockwise direction for gripping the tool to maintain it within the semicircular opening 5T. As illustrated in FIG. 3, the inner, lower ends of the pivotal latches 79 and 90 are provided with double acting angular cam faces. Thus, both levers are cammed to pivot outwardly upon movement of a tool either into or out of engagement with the semi-circular opening 50T.

Upon movement of the tool support 50S into complete engagement with a tool, therefore, the inwardly extending latches 79 and 80 are resiliently urged into tight gripping engagement therewith. At the same time, a tool gripped by the tool support is constrained against axial movement in either direction, this relationship being more clearly shown in FIG. 4. As there shown, a cutting tool or drill 95 is secured within a toolholder 96, the latter being represented as in clamped engagement with a releasable spindle collet 97. In order to be releasably gripped by the spindle collet 97 during a machining operation, all of the toolholders have a shank of like diameter, and each of them is adapted to carry a different cutting tool to facilitate operation of the spindle in the performance of diverse metal cutting operation. Further, the toolholder 96 in FIG. 4 is provided with a forward shank portion 102 of a diameter complementary to the diameter of the semi-circular opening 50T, FIGS. 3 and 4, in the outer end of the tool support 50S. As likewise shown in FIG. 4, the forwardly extending tool holder shank 102 is provided with peripheral flanges 103 and 104. With the tool support 50S in gripping engagement with the toolholder 96, as shown, the opposite side faces of the tool support are engaged by the stationary, peripheral toolholder flanges 103 and 104. Thus, the toolholder 96 is constrained against axial movement by the tool support 50S during translational movement thereof relative to its retracted or storage position. In like manner, the other tool supports 45 to 49 and 51 to 55 inclusive are provided with semi-circular tool receiving openings 45T to 49T and 51T to 55T, as well as pair of cooperating pivotable tool engaging latches associated with each of them.

As shown in FIG. 4, the tool spindle 34 is rotatably journaled in the spindle head 33 in well-known manner. Antifriction bearings 106 and 107, the outer flanged races of which are seated within spaced apart bored openings in the spindle head 33, are provided with inner races directly engaging the tool spindle 34. The usual lock nut 110 is threadedly engaged on the central portion of the spindle 34 in tight abutting engagement with the inner race of the rear bearing 107 for maintaining the spindle in its properly journaled position within the spindle head 33.

A low range gear 112 and a high range gear 113 are splined to the central forward portion of the spindle 34 and are secured thereto by a clamp nut 114. As schematically illustrated in FIG. 4, power for driving one or another of the gears 112 or 113, is derived in well-known manner from a variable speed transmission 116 driven by a motor 117.

As a prerequisite to effecting a tool change, spindle rotation is stopped by deactivating the input power drive from the transmission 116 and effecting engagement of a multiple disc spindle brake 120. As known in the art, the spindle brake 120 comprises a stationary brake housing 121 fixedly bolted to suitable webbing formed with the spindle head 33 by cap screws 123, and a cooperating relatively rotatable housing 122 fixedly secured directly to the spindle 34 for rotation therewith. Engagement of the multiple disc brake to stop spindle rotation is effected by supplying pressure fluid via a supply line 125, thereby effecting frictional engagement of the usual friction discs 126 operatively interconnected between the brake housings 121 and 122.

To prevent the admission of coolant within the spindle head 33, the usual combined dust collar and slinger 129 is secured to the forward end of the spindle head 33 in encircling relationship to the forward end of the rotatable tool spindle 34. Within the internally tapered or conical forward end of the spindle 34, the clamp collet 97 is carried for slight axial movement. The forward end of the collet 97 comprises a plurality of externally tapered, segmented clamp jaws 132 that are complementary to the conical spindle, these jaws being resiliently and integrally formed with an internally threaded collet actuating hub 133. With the collet 97 urged in an axial rearward direction, the externally tapered jaws 132 thereof are urged radially inward by the conical spindle into tight clamping engagement with the rearwardly extending shank of the tool holder 96. Conversely, upon slight axial forward movement of the collet hub 133, the jaws 132 are permitted to move resiliently outward in well known manner to release the toolholder 96.

To accomplish this, the collet hub 133 is threadedly connected to the forward end of a collet actuating rod 136 extending rearwardly through an axially bored opening formed in the tool spindle 34. At its extreme rearward end, a thrust collar 137 is secured to the rearward end of the collet actuating rod 136 by means of a nut 137A. A Belleville spring 138 is interposed between the rearward end 140 of the spindle 34 and the thrust collar 137 in a manner to urge the rod 136 and collet hub 133 axially rearward to urge the collet jaws 132 into tight gripping engagement with the circular shank of the toolholder 96.

To release the collet 97 for interchanging tools, a collet release cylinder 143 is secured by means of an adjusting screw 144 to the inner wall of the spindle head 33 in a position of axial alignment with the collet actuating rod 136. A hydraulic supply line 156 is connected to selectively supply pressure fluid for operating the release cylinder 143 in a manner to urge a plunger 147 thereof axially forward to effect corresponding forward movement of the collet actuating rod 136, thereby compressing the Belleville spring 138. It will be apparent that axial forward movement of the actuating rod 136 effects a corresponding forward movement of the collet hub 133 to provide forward and outawrd movement of the resiliently biased collet jaws 132, thereby releasing the toolholder 96. With the collet 97 maintained in its forward unclamped position, relative axial movement may then be effected between the tool support 50S and the tool spindle 34 for effecting relative axial movement of the toolholder from the unclamped collet 97.

Figure 7:
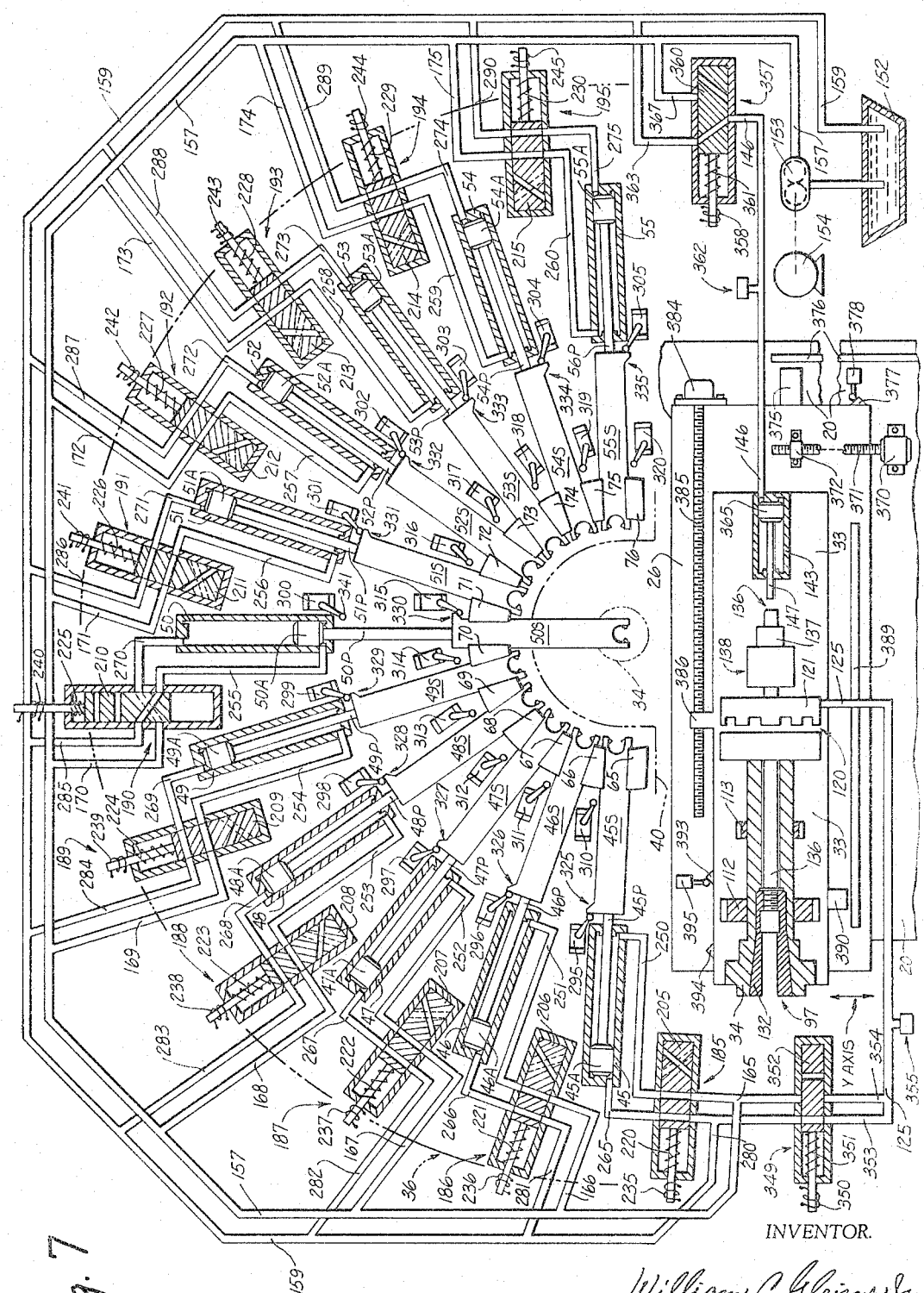
FIG. 7 is an enlarged schematic view of the hydraulic circuit diagram for effecting individual, selective actuation of the separate tool supports in combination with release of the spindle securing collet.

For selectively interchanging toolholders between the spindle 34 and the combined unitary storage and interchange means 36, there is provided a selectively actuatable hydraulic control circuit as schematically represented in FIG. 7. As there shown, hydraulic fluid is withdrawn from a reservoir 152 by means of a pump 153 driven by a motor 154 to supply hydraulic fluid under pressure to a main supply line 157. The usual main exhaust line 159 is connected to return fluid to the reservoir 152. From the main supply line 157, fluid under pressure is transmitted via a plurality of branch lines 165 to 175 inclusive to a plurality of solenoid actuated valves 185 to 195 inclusive. The valves 185 to 195 inclusive are respectively provided with axially movable valve spools 205 to 215 inclusive that are normally resiliently biased to their inward positions by springs 220 to 230 inclusive. Whenever the valve spools are biased inwardly by springs 220 to 230 inclusive, it will be apparent that fluid under pressure is transmitted to the cylinders 45 to 55 inclusive in a manner to retain the respective tool supports 45S to 55S in radially retracted or storage positions. To effect selective extensible movement of one of the tool supports, the valves 185 to 195 inclusive are provided with selectively energizable solenoids 235 to 245 inclusive.

For retaining the tool supports 45S to 49S inclusive in retracted storage position, as shown in FIG. 7, the fluid is transmitted from branch lines 165 to 169 inclusive by ports in the resiliently biased valve spools 205 to 209 connected to supply fluid under pressure to branch lines 250 to 254 that are respectively connected to corresponding ends of cylinders 45 to 49. Pressure fluid from the branch lines 205 to 254 enters the ends of the associated cylinders to urge pistons 45A to 49A contained therein to their outward positions, effecting corresponding radially retracted movement of the associated piston rods 45P to 49S inclusive. With this condition existing, pressure fluid from the cylinders 45S to 49S is exhausted via branch lines 265 to 269 inclusive, these exhaust lines being connected via ports in the associated valve spools to branch exhaust lines 280 to 284 all of which are connected directly to the main exhaust line 159 for returning fluid to the reservoir 152.

In a similar manner, the tool supports 51P to 55P are represented in FIG. 7 as being maintained in their radially retracted storage positions. As there indicated, the piston actuators 51A to 54A are urged radially outward by fluid under pressure admitted to the corresponding ends of cylinders 51 to 55 by branch lines 256 to 260. At the same time, pressure fluid from these cylinders 51 to 55 is exhausted via branch lines 271 to 275 which are connected by ports in the resiliently biased valve spools to branch exhaust line 286 to 290 inclusive connected to the main exhaust line 159.

It is now assumed that the empty tool support 50S is to be moved radially inward to engage a toolholder carried by the spindle 34 for the purpose of returning that particular tool to a retracted storage position, after which a selected tool carried by one or another of the other tool supports may be transferred into operating position within the tool spindle 34. To effect radially extensible movement of the tool support 50S, the solenoid 240 is energized to effect movement of the valve spool 210 of the control valve 190 in opposition to the spring 225. With the valve spool 210 urged to move in opposition to the spring 225 as shown in FIG. 7, branch line 255 from one end of cylinder 50 is now connected by a valve spool port to the branch exhaust line 285 for returning fluid to the reservoir 152. At the same time, pressure fluid from the branch supply line 170 is transmitted via another valve spool port of the energized valve 190 to the branch line 270 for supplying fluid under pressure to urge the piston 50A radially for moving the piston rod 50P and tool support 50S in a corresponding direction. As this occurs, a sequence control switch 300 is deactuated, another sequence control switch 315 and is actuated. To actuate the switch 315, a cam surface 330 diagrammatically illustrated in FIG. 7 as being integrally formed with the tool support 50S is movable into engagement with a pivotable switch arm 340, FIG. 2, associated with the switch 315. Upon arrival of the tool support 50S in its radially outward position, the switch 315 is actuated for initiating the next required movement in a tool change cycle.

As will hereinafter be more fully explained, actuation of the sequence control switch 315 initiates one of two different movements, depending upon the portion of the tool change cycle which is then taking place. Irrespective of the portion of the tool change cycle occurring, the cam 330 of tool support 50S actuates switch 315 in its outermost position, and upon return movement to storage position engages a pivotable switch arm 341 to actuate the other sequence control switch 300. Switch 300 likewise functions as a sequence control to initiate the next required portion of a complete tool change cycle.

As represented in FIG. 7, the tool supports 45S to 55S are each provided with integrally formed switch actuating cams 325 and 335 inclusive. In all cases, the tool support cams 325 to 335 are carried for rectilinear movement between one group of sequence control switches 295 to 305, and the other respectively associated sequence control switches 310 to 320 inclusive. Whenever the tool supports are moved to radially retracted storage positions one or another of the associated sequence control switches 295 to 305 is actuated. With the tool supports 45S to 49S retracted as shown, the integrally formed switch engaging cams 325 to 329 are retained in position to maintain the engagement of switches 295 to 299 inclusive. Likewise, with tool supports 51S to 55S in retracted positions as shown, the respective switch cams associated therewith are moved into actuating engagement with the switches 301 to 305 inclusive. It is to be noted that the switches 295 to 305 and the switches 310 to 320 are fixedly secured to the main support plate 40. For simplicity in the drawings, the various sequence control switches are not shown in FIG. 1 thereof.

To control the rate of extensible and retracting movement of the tool supports 45S to 55S, it will be understood that throttle control valves (not shown) are respectively included in the branch pressure supply lines 165 to 175 inclusive; additional throttle control valves (not shown) are interposed in the branch exhaust lines 280 to 290 inclusive. By means of the throttle control valves (not shown) the rate of advancement and retraction of each of the tool supports can be independently adjusted.

As a prerequisite to effect a tool change, as hereinbefore explained, it is necessary to deactivate the input power drive from the transmission to one of another of the spindle drive gears 112 or 113. With the input power drive for rotating the tool spindle 34 disconnected, it is likewise necessary to effect engagement of the multiple disc brake 120 to restrain the spindle against rotation during a tool interchange. For effecting engagement of the multiple disc brake 120, as shown in FIG. 7, there is provided a control valve 349 the activation of which is effected by an associated solenoid 350. The control valve 349 is provided with a valve spool 352 that is normally biased to a righthand position by means of an associated spring 351. With the valve spool 352 positioned as shown in FIG. 7 the branch exhaust line 280 is connected via a port in the valve spool 352 to a branch line 353 that is connected by line 125 to the stationary housing 121 of the multiple disc brake 120. With the line 125 connected to exhaust, the spindle brake 121 is disengaged.

To effect engagement of the spindle brake 120, the solenoid 350 is energized effecting leftward movement of the valve spool 352 in opposition to spring 351, thereby connecting the branch pressure supply line 165 via a port in the leftwardly moved valve spool 352 to a branch line 354 that is connected to supply pressure fluid to the line 125 for effecting engagement of the multiple disk brake 120. Whenever the brake 125 is engaged, pressure fluid in the supply line 125 effects actuation of a pressure actuated sequence control switch 355.

To effect selective disengagement of the spindle collet 97 for withdrawing a toolholder from the tool spindle 34, there is provided another control valve 357 that is actuated by a solenoid 358. With a valve spool of the control valve 357 biased rightwardly by means of a spring 361, a branch exhaust line 363 is connected via a port in the valve spool 360 to the line 146, thereby connecting the collet release cylinder 143 to exhaust as shown in FIG. 7. With this condition existing, no pressure is applied to the piston 365 which is secured to the actuating rod 147, and the spring 138 operates to urge the collet actuating rod 147, and the spring 138 operates to urge the collet actuating rod 136 in a rightward direction for maintaining the collet 97 in its clamped or tool gripping position.

Energization of the solenoid 358 effects leftward movement of the valve spool 360 in opposition to the spring 361, and interconnects a branch pressure supply line 367 via another port in the leftwardly moved valve spool 360 to the line 146. As this occurs, pressure fluid supplied from the line 146 to the cylinder 143 effects movement of the piston 365 and actuates the plunger 147 to effect corresponding axial movement of the rod 136 to disengage the collet 97 from its normally biased clamped position. With the solenoid 358 energized to release the collet 97 for withdrawing a tool from the spindle 34, pressure fluid in the supply line 146 effects actuation of a pressure actuated sequence control switch 362 for initiating the next required function in a tool change cycle.

During the tool interchange, the solenoid 350 is continuously energized to maintain the valve spool 352 of the brake control valve 349 in its leftward position to effect continuous engagement of the spindle brake 120. It will likewise be apparent that the solenoid 358 is selectively energized during a tool interchange. In contrast, the collet release solenoid 358 is energized to unclamp the spindle collet for permitting withdrawal of a tool carried by the spindle at an appropriate time during an interchange, and is maintained in energized condition to permit the insertion of the next selected tool into the tool spindle. After this, the solenoid 358 is deenergized to permit resiliently biased rightward movement of the valve spool 360 and reengagement of the collet to grip the selected tool that has then been inserted into the tool spindle 34.

Prior to initiating a tool change cycle, as hereinbefore explained, it is necessary that the tool spindle 34 be vertically moved along the Y axis to a predetermined position with respect to the radially extensible tool supports, and as represented by the phantom line position of the tool spindle in FIG. 7 with respect to the radially extended tool support 50S. For effecting vertical movement of the saddle 26 to move the tool spindle 34 into the predetermined required axial position alignment, there is provided a servo driven motor 370 secured to the vertically upstanding column 20. The motor 370 is connected to drive an elevating screw 371 that engages a nut 372 secured to the saddle 26, as schematically illustrated in FIG. 7. For controlling vertical movement of the saddle 26 to a predetermined position along the Y axis, there is provided a reading head 375 secured to the vertically movable saddle 26 cooperable with a vertically disposed scale or transducer 376. For moving the spindle 34 to predetermined axial position to initiate a tool change function, the motor 370 is energized to effect vertical movement, the extent of movement being controlled by feedback signals from the selectively energized reading head 375 and transducer 376. Upon arrival of the spindle 34 in predetermined axial aligned position, a dog 377 secured to the saddle 26 actuates a switch plunger of a sequence control limit switch 378 to condition the control circuit for the next function in a tool change cycle.

In addition to movement of the saddle 26 vertically at the start of a tool change cycle, the spindle head 33 is moved horizontally relative to the saddle 26 along the Z axis to one of two preselected tool change positions. To accomplish this, a servo controlled motor 384 secured to the saddle 26 is connected to rotate a screw 385 that engages a cooperating nut 386 secured to the spindle head 33. For controlling extent of the horizontal movement of the spindle 33 relative to the saddle 26, a selectively energizable transducer 389 secured to the saddle 26 is cooperable with a reading head 390 secured to the spindle head 33. Positioning movement of the spindle head 33 to one of two predetermined axially positioned tool change stations is effected by supplying one of two predetermined position control signals, as will hereinafter be more fully explained, with arrival in the selected position being indicated by a dog 393 or a dog 394 secured to the spindle head 33. On axial movement of the spindle head 33 in response to energization of the motor 384, movement is stopped by predetermined actuation of the transducer 389 in response to one position control signal to so position the spindle head 33 that the dog 393 actuates a sequence control limit switch 395 to position the tool spindle 34 in its axial forward conditions the control circuit for effecting the next required movement in the tool change cycle. Actuation of the switch 395 by the dog 393 occurs at two times during a tool interchange, i.e. in preparation for an empty tool storage support being extensibly moved into engagement with a tool gripped by the spindle, and after the rearwardly moved unclamped spindle has been moved forwardly into re-engagement with the next selected, axially aligned tool to be operatively inserted into the spindle for the next machining operation.

After an empty tool support has been moved into engagement with a tool gripped by the spindle and which has been repositioned in its forward axial tool change station, solenoid 358 is energized to release the tool gripping spindle collet 97. Next, the motor 384 is reenergized to effect axial retracting movement of the tool spindle 34 under control of the second position control signal until the removed tool now gripped by the extended tool support is completely withdrawn from the spindle. At this moment, the spindle head 33 will have been moved axially rearward to a position in which the dog 394 actuates the sequence switch 395 to condition the control circuit for the next tool change function, this position likewise being determined by the coaction between the reading head 390 and transducer 389 to deenergize the motor 384.

Before proceeding with a description of an illustrative tool change cycle, it is to be noted that the transducers 376 and 389 cooperate with the respective reading heads 375 and 390 to control positioning movement of the tool spindle 34 for the performance of machining operations in addition to predetermining the position of the tool spindle for effecting an interchange of tools. During movement of the tool spindle 34 to effect machining operations, the sequence control switches 378 and 395 have no effect on machine movements even though these switches are actuated by the associated dogs during such movements. In other words, the sequence control limit switches 378 and 395 are operatively interconnected in the control circuit only during predetermined controlled movement of the vertical drive motor 370 and transverse drive motor 384 for effecting a tool change cycle. Likewise, the reading heads 375 and 390 are predeterminately energized in combination with associated transducers 376 and 389 to effect the required feedback control of the energized motors 370 and 384 according to the requirements of a tool change cycle.

To better illustrate the machine movements required for effecting an interchange of tools between the tool spindle 34 and the combined unitary storage and tool change means 36, reference is now made to FIGS. 8A to 8F inclusive. It will first be assumed that the milling cutter 95 is gripped in the tool spindle 34 and that the spindle head 33 is positioned remote from the tool change station at the completion of a prior machining operation. With the tool support 50S being retained in its retracted storage position by cylinder 50, the spindle head 33 is moved vertically along the Y axis and horizontally along the X axis to position the tool spindle 34 in its forward axial tool change position, and in predetermined radially spaced relationship to the still retracted empty tool support 50S. Further, the input driving power to the tool spindle 34 is deactuated, and the spindle brake 120 is engaged to stop spindle rotation as a necessary prerequisite to the tool change cycle. With the aforementioned conditions having been established, the cylinder 50 is then activated to effect radially extensible movement of the empty tool support 50S to its fully extended position into gripping engagement with the flanged forward end of the toolholder 96 carrying the cutting tool 95. This condition is illustrated in FIG. 8, and during this interval of the cycle, the toolholder is simultaneously gripped by the collet 97 and the fully extended tool support 50S.

After the empty tool support 50S has been extended into gripping engagement with toolholder as shown in FIG. 8A, the collet release cylinder 143 is actuated to extend the plunger 147 and effect movement of the collet 97 to disengaged position, permitting axial withdrawal of the toolholder from the spindle 34. With the spindle collet 97 dynamically maintained in disengaged condition and the toolholder 96 gripped by the tool support 50S, it will be apparent that the toolholder can be fully withdrawn from the spindle 34 by effecting relative axial movement between the tool support 50S and the spindle head 33. This condition is illustrated in FIG. 8B, in which the spindle head 33 has been axially retracted to its rearward tool change station to clear the rearwardly extending end of the toolholder 96 which remains fixedly gripped in the tool support 50S.

Upon retracting movement of the spindle head 33 to its rearward change station, the cylinder 50 is again activated to effect radial retracting movement of the tool support 50S with the toolholder 96 gripped therein for return to its storage position. During all of these movements to remove the toolholder 96 from the spindle 34, the spindle head 33 is dynamically retained in predetermined axially spaced relationship to the unitary tool storage and interchangeable means 36. Likewise, the spindle head 33 is retained in its rearward tool change station during the interval the next selected tool is moved into axial alignment with the tool spindle 34 for bodily insertion into the tool spindle 34.

It will now be assumed that the next selected tool for insertion into the spindle is the drill 404 carried by a toolholder 403 which is gripped by the still retracted toolholder 51S in its storage position relative to the tool spindle 34 which is maintained in proper axially spaced rearward tool change position. With these conditions existing, the cylinder 51 is activated to effect radially extensible movement of the toolholder 51S to fully extended position for aligning the toolholder 403 axially with the retracted tool spindle 34, as shown in FIG. 8B. As soon as the toolholder 51S has been fully extended to align the toolholder 403 axially with the spindle, the spindle head 33 is moved axially to its forward tool change position in a manner that the toolholder is axially inserted into the still unclamped spindle collet 97.

After this occurs, the spindle collet is reactivated into gripping engagement with the axially inserted toolholder 403 inasmuch as the drill 404 has been preselected for the next required machining operation. During this interval of the tool change cycle, the toolholder is simultaneously gripped by the radially extended tool support 51S and the spindle collet 97. As soon as the spindle collet has been moved into gripping engagement with toolholder 403, the cylinder 51 is again activated to retract the now empty tool support 51S to its radially retracted storage position, this condition being illustrated in FIG. 8F. With the next selected tool now gripped in the tool spindle 34 as illustrated in FIG. 8F, the spindle head 33 may be selectively moved to effect the next required machining operation.

A control circuit for operating the machine and effecting an interchange of tools between the tool spindle 34 and the unitary combined tool storage and interchange means 36 is schematically illustrated in FIG. 9. As thereshown, current from the usual three phase source 407 is connected upon closure of a disconnect switch 408 to energize line conductors L1, L2 and L3. From the line conductors, current is transmitted to energize a transformer 409 that is operative in well known manner to supply current of reduced voltage to energize control circuit conductors 412 and 413. Conductor 413 is connected to energize a conductor 414 which is connected via a normally closed pushbutton stop switch 415 to energize a conductor 416. Momentary closure of a normally open switch 418 completes the circuit from conductor 416 via conductors 421 and 422 to the coil of a motor start relay 423, this circuit being completed via a conductor 424 connected to the energized output supply conductor 412. Upon energization of the relay 423 to upward closed position, the three lower contact bars thereof are moved upwardly to complete circuits from the line conductors L1, L2 and L3 to energize conductors respectively connected via the three normally closed contact bars 426 of a relay 427 to energize conductors 419, 420 and 421A for energizing the spindle drive motor 117. Energization of the conductors due to closure of the relay 23 likewise effects energization of the pump drive motor 154. ith the coil of relay 423 energized, a seal-in circuit from energized conductor 416 is completed via a conductor 429, the now closed contact bar 423A to the conductor 422. With the pump motor 154 and spindle drive motor 117 now energized for rotation, the machine may be operated to perform machining operations and for effecting tool changes.

It will now be assumed that the machine is to be operated for a program of different machining operations requiring a total of eleven (11) different tools which are to be used in predetermined sequence. Inasmuch as the tool supports 45S to 55S inclusive in FIG. 7 are operated in sequence to interchange tools, the first tool support 45S is left empty and the first tool of the required eleven (11) tools is manually loaded directly into the tool spindle 34. This is accomplished by depressing a pushbutton switch 433 to complete a circuit from energized conductor 412 via conductor 434 to effect momentary energization of a conductor 435. The conductor 435 is, in turn, connected to energize a conductor 436 and the spindle collet release solenoid 358, the opposite terminal of which is connected via a conductor 438 to the energized supply conductor 414. With the collet release solenoid 358 momentarily energized as described, the first tool of the required series of eleven (11) tools is manually loaded directly into the tool spindle 34, after which switch 433 is released for actuating the collet to grip the first required tool in the spindle. With the first tool of the required series now gripped in the tool spindle 34, the remaining ten (10) tools of the series are then manually loaded into the tool supports 46S to 55S inclusive, FIG. 7, in the sequence in which they are to be used for a preselected program of different machining operations.

After completion of the machining operations requiring the first tool loaded into the spindle, the machine is then operated to return that tool into the empty tool support 45S and sequentially thereafter insert the second required tool then carried in the tool support 46S into the tool spindle. Tool changes can be initiated either manually or in response to tape control, the tape control changes comprising a part of a complete program of machine movements and tool changes. Subsequent tool changes are effected in like manner, with the tool gripped in the spindle being first returned to the appropriate empty tool support; and with the next tool support being operated to insert the tool carried thereby into the tool spindle. A complete series of machine movements required to interchange tools can be termed a tool change cycle. In all cases, a tool change cycle requires first the extensible movement of an empty tool support for returning the tool then carried by the spindle to a retracted storage position; and second, the extensible movement of the next tool support for transferring the tool carried thereby into the spindle in preparation for the next series of machining operations. Phrased in a different way, each of the tools in a required group of eleven (11) tools has a permanent "address" with respect to the tool supports 45S to 55S inclusive.

To manually initiate an interchange of tools, there is provided a pushbutton switch 440, as shown in FIG. 9. To effect an automatic program controlled interchange of tools, there is provided a relay 442 energizable in response to a control tape for effecting momentary closure of a normally open associated contact 443. Thus, selective tool changes can be effected either by momentarily depressing the pushbutton tool change switch 440 or effecting tape controlled momentary closure of the contact 443.

The various movements to be effected for a tool interchange are sequentially controlled by a stepping switch 445 having a pair of wiper arms 446 and 447 interconnected by a shaft in well known manner for simultaneous, stepping movement from their home positions represented in FIG. 9 throughout a sequential, indexable advancement of nine successive steps to effect a complete cycle of tool change movements. After each tool change has been completed, the wiper arms 446 and 447 are returned to the home positions as represented in solid lines in FIG. 9 in preparation for effecting the next required tool interchange. As will hereinafter be more fully explained, the wiper arm 446 is operatively connected to initiate each function or movement required in a complete tool interchange cycle. The associated switch wiper arm 447 is simultaneously interconnected via the various limit switches and pressure switches to signal completion of the prior step or function of a tool interchange for operation to advance both of the wiper arms to the next successive step to initiate the next required step.

With the first tool gripped by the tool spindle 34, and the other ten required tools respectively manually loaded into the tool supports 46S to 55S inclusive, it will be apparent that eleven complete tool change cycles are effected to utilize the eleven preselected tools during a particular program of machining and tool change operations. At the completion of eleven tool changes, the starting conditions will again prevail with the tool support 45S then being empty and the tool for that particular support being again gripped by the tool spindle.

As each of the eleven succeeding tool change cycles is completed, another stepping switch 450 is energized for advancement to interconnect the next required pair of tool supports for operation in response to the function control tool change stepping switch 445. The stepping switch 450 is provided with a pair of wiper arms 451 and 452 interconnected in known manner for simultaneous indexable advancement to one of eleven different positions, as shown in FIG. 9. With the wiper arms 451 and 452 in their first or home positions as represented by the solid lines in FIG. 9, conditions are established for returning the tool in the spindle to the empty tool support 45S and for sequentially advancing a tool carried by the tool support 46S into operative engagement with the tool spindle. In other words, the stepping switch wiper arm 451 is always positioned to effect extensible movement of an empty tool support for receiving the tool then carried by the tool spindles; and, the associated stepping switch wiper arm 452 is simultaneously connected to effect the required sequential advancement of the next tool support for transferring the tool carried thereby into operative position in the tool spindle.

To initiate an illustrative sixth tool change cycle, the tool change cycle control switch 440, FIG. 9, is momentarily depressed completing the circuit from the energized conductor 421 to a conductor 514, a branch conductor 515, a normally closed contact 516 associated with the stepping switch plunger rod 524 to a conductor 518. The circuit continues from conductor 518 to one terminal of the coil 517, and continues via conductors 520, 522 and 523 to the energized conductor 412. Upon completion of this circuit, momentary energization of the coil 517 effects immediate downward movement of the associated index plunger 524 that is operative in well known manner to effect indexable advancement of the wiper arms 446 and 447 of the stepping switch 445. Downward movement of index plunger 524 effects repositioning of the pivotable pawl secured thereto into engagement with another portion of an associated notched plate 529 fixedly secured to the shaft caryring wiper arms 446 and 447. Downward movement likewise moves a collar 525 downwardly to compress a spring 526, and effects movement of the normally closed associated contact bar 516 to an open position, thus interrupting the circuit to the coil 517. Thereupon, the collar 525 secured to the index plunger 524 is urged upwardly by the compressed actuating spring 526 and for moving the index plunger 524 upwardly to effect a single step advancement of the wiper arms 446 and 447 into engagement with the respectively associated first contacts.

Advancement of the wiper 446 into engagement with the first contact initiates the first machine movements or functions necessary to effect the sixth tool change cycle; and, engagement of the associated wiper arm 447 with its first contact completes a circuit to effect the next single step indexable advancement of the stepping switch 445 upon completion of the functions initiated by the wiper arm 446 during its first position. With the wiper arm 446 engaging the first contact, a circuit is completed from the energized conductors 412 and 522 via the wiper arm 446 to a conductor 532. The energized circuit from conductor 532 continues via conductor 533, and a conductor 534 to energize the relay coil 427, this circuit being completed via a conductor 535 connected to the energized supply conductor 414. Energization of the relay 427 effects movement of the upper three associated, normally closed contacts 426 to open position for the purpose of deenergizing the spindle drive motor 117, thereby disconnecting the input driving power to the tool spindle. At the same time, upon energization of the relay coil 427, another associated normally open contact 537 is moved to closed position to complete a circuit for effecting energization of a spindle brake control relay 540.

For constraining the spindle against rotation, a circuit is completed from energized conductor 414, conductor 535, relay 427, conductors 534 and 533 to one terminal of the relay 540. This circuit continues along a conductor 541, the now closed contact 537, of the energized relay 427 to a conductor 544. This circuit continues from conductor 544 via the normally closed contact 545 of a tool change cycle complete relay 546 to a conductor 547 connected via a common conductor 548 to the energized supply line 412. Energization of the brake control relay 540 effects closure of an associated normally open contact 550 to complete a circuit from the energized conductor 412 to a conductor 551 for energizing the spindle brake solenoid 350, the opposite terminal of this solenoid being connected via conductor 552 to the energized supply conductor 414. Energization of the relay 540 effects closure of another associated contact 555 to complete a seal-in circuit for maintaining relays 427 and 540 simultaneously energized for the complete duration of a tool change cycle. As shown in FIG. 9, the seal-in circuit extends from conductor 533 via the now closed contact 555 to a conductor 556 connected to the energized supply conductor 414.

With the wiper arm 446 still retained in its first position, circuit conditions are likewise established for effecting the required vertical movement of the saddle along the Y axis and axial movement of the spindle head along the Z axis. The Y axis positioning circuit is completed from the conductor 533 along a conductor 558 to energize a Y axis control relay 559, this circuit being completed via a conductor 560 to the Y axis positioning control 561, and thence via a conductor 562 connected to the energized supply line 414. At the same time, another circuit from conductor 533 is completed via a normally closed relay contact 564 to a conductor 565 for energizing a forward Z axis position control relay 566 to a conductor 567 connected via the Z axis forward positioning control 568 to a conductor 569 connected to the energized supply conductor 414. As will hereinafter be more fully explained, energization of the X axis position control relay 559 and the forward Z axis position control relay 566 interconnects servo control positioning drives to move the tool spindle to its proper Y, and forward Z axis position at the start of a tool interchange. As soon as all of the required machine functions have been effected via the stepping switch wiper 446 in its first indexable position, another circuit is completed via the associated wiper arm 447 for indexably advancing both wiper arms to their second tool change cycle positions. As represented in FIG. 9, the stepping switch indexing coil 517 is connected at one terminal by the conductor 518 and a normally closed associated contact 516 to the conductor 515. Conductor 515 is, in turn, connected via another conductor 573 to the associated stepping switch wiper arm 447 which is now positioned in engagement with the first contact.

The first stepping switch indexing circuit is therefore completed from conductor 573, via the wiper arm 447 now connected to a conductor 574 via the now closed contact 575 associated with energized relay 540 to a conductor 576. With the brake control solenoid 350 energized as described, the associated brake pressure switch 355 is actuated to effect closure of contact 577 completing the circuit from conductor 576 to a conductor 578. With the spindle moved to the required Y axis position, the associated position indicating switch 378 is actuated to a closed position completing a circuit to conductor 579, and thence via the now closed contact of the forward, Z axis position indicating switch 395 to a conductor 580 connected to the energized conductor 414. With these conditions having been established during step one of a tool change cycle, it will be apparent that a circuit is now completed from the energized conductor 414 via the stepping switch wiper arm 447 to the conductor 573 and conductor 515 to effect energization of the stepping switch index coil 517. Energization of the coil 517, as hereinbefore explained, effects downward movement of the index plunger 524 in opposition to the spring 526 for appropriately positioning the associated pivotable pawl for effecting the next indexable movement. As this occurs, the associated contact 516 is moved to open position, permitting indexable advancement of the wiper arms 446 and 447 to their second positions for controlling the next required function in a tool change cycle.

With wiper arm 446 indexably advanced to its second position, a circuit is completed from the energized supply conductor 522 via the wiper arm 446 to a conductor 583. The circuit continues from conductor 583 via the coil of the relay 584 to a conductor 585 connected to the common output conductor 454 which is connected directly to the wiper arm 451 of the stepping switch 450, as hereinbefore explained. With the wiper arm 451 indexably advanced to the dotted line sixth position, this circuit continues along the conductor 481 to effect energization of solenoid 240 which is operative to effect extensible movement of the now empty tool support 50S into gripping engagement with the tool carried by the tool spindle. This condition corresponds to that illustrated in FIG. 8A, as hereinbefore explained. With the tool support 50S moved to its extensible limit of movement, the control switch 315 is actuated to indicate that the support is in engagement with the tool carried by the spindle 34 which is retained in its forward, tool changing position with respect to the unitary tool storage and changing means 36. Prior to this, a seal-in circuit for maintaining solenoid 240 energized, is established upon energization of the relay 584. As soon as this occurs, the common conductor 454 is connected via a now closed contact 587 of the energized relay 584 and continues via a normally closed relay contact 589 to a conductor 590 connected to the energized common conductor 548. For maintaining relay 584 energized upon subsequent indexable advancement of the wiper arm 446, there is provided a conductor 592 interconnected between the conductor 583 and the common conductor 454.

A circuit for effecting indexable advancement of the stepping switch 445 to its third position is now completed from conductor 573 via the wiper arm 447 (in its second position) to a conductor 593, via the now closed limit switch 315 to a conductor 594, conductor 595 and 596 to the energized supply conductor 414. Thus, an energized circuit is completed to indexably advance the wiper arms 446 and 447 into their third positions to effect actuation of the spindle collet for releasing the tool which is now gripped by the radially extended tool support 50S. To accomplish this, a circuit is completed from the wiper arm 446 to a conductor 597, connected via the coil of a relay 598 to a conductor 599 connected to effect energization of the conductor 436 for energizing the collet release solenoid 358, FIGS. 7 and 9. To maintain the collet release solenoid 358 energized for the required time interval, a seal-in circuit is established from conductor 436 along a now closed contact 601 of the energized relay 598 and a normally closed contact 602 to a conductor 603 connected to the common energized supply conductor 548.

Upon energization of the collet release solenoid 358, the pressure switch 362 is actuated to effect closure of an associated normally open contact 606, FIG. 9, to effect indexable advancement of the stepping switch 445 from its third to its fourth position. To reenergize the stepping switch coil 517, this circuit is completed along conductors 515, 573, the wiper arm 447 to a conductor 607, the now closed contact 606 of the activated pressure switch 362, to a conductor 608. From the conductor 608, the stepping switch index circuit continues via the conductor 595 and conductor 596 to the energized supply conductor 414.

With the tool now gripped by the extended tool support 50S and the tool collet released, a condition is established for effecting relative axial movement between the tool support 50S and the spindle 34 to the positions indicated in FIG. 8B. The circuit for accomplishing this is established from the wiper arm 446 to a conductor 611 to energize a rearward Z axis position control relay 612 to a conductor 613. From the conductor 613, the energized circuit continues via a normally closed contact 614 to a conductor 615 connected to the rearward Z axis position controller and thence to a conductor 617 connected to the energized supply conductor 414. In addition to activating the rearward Z axis position control 616, energization of the relay 612 effects movement of an associated contact 564 to its open position. Movement of the normally closed contact 564 to open position interrupts the energized circuit to the conductor 565 for deenergizing the relay 566 and disconnecting the forward Z axis position controller 516.

As this occurs, a seal-in circuit is established from the conductor 611 via a conductor 620 and the now closed contact 621 of the energized relay 612 to a conductor 622 connected to the common energized supply conductor 548. As the spindle head 33 is moved from its forward tool change position, represented in FIG. 7, to its rearward tool change position, it will be apparent that the associated limit switch 395 is deactuated and reactivated upon engagement with the rearward Z position dog 394. As soon as the spindle head 33 is moved to its appropriate rearward tool change position, therefore, a middle contact bar 624 associated with the switch 395 is moved to closed position upon reactuation of the switch 395, by the dog 394 thereby effecting the next indexable advancement of the stepping switch 445. For advancing the stepping switch to its next, or fifth position,, a circuit is completed from the stepping switch coil 517, conductor 518, normally closed contact 516, conductor 573 and the wiper arm 447 to a conductor 625. From the conductor 625, the circuit continues via the now closed contact bar 624 to conductor 595 connected via conductor 596 to the energized supply conductor 414.

With the stepping switch coil 517 reenergized in response to closure of the contact bar 624 of switch 395, the stepping switch wiper arms 446 and 447 are indexably advanced from their fourth to fifth positions for effecting retracting movement of the tool support 50S with the tool 96 now gripped therein to storage position, as shown in FIG. 8C. To accomplish this, a circuit is now completed from the energized conductor 522 via the stepping switch wiper arm 446 to a conductor 626 connected to effect energization of a relay 627, the opposite terminal of which is connected via the conductor 628 to the energized conductor 414. Energization of the relay 627 effects movement of the associated normally closed contact 589 to open position thereby interrupting the seal-in circuit from energized conductor 590. Movement of the conductor 589 to open position is thus disposed to simultaneously effect deenergization of the seal-in relay 584 and interrupts the energized circuit to the common conductor 454 for effecting deenergization of the solenoid 240. Upon deenergization of the solenoid 240, as hereinbefore explained with reference to FIG. 7, the spring 225 effects axial forward movement of the valve spool 210 to connect the cylinder 50 for effecting axially rearward movement of the tool support 50S to its fully retracted position in which the sequence control switch 300 is actuated.

With the stepping switch wiper arm 447 now engaging its fifth contact, closure of the sequence control switch 300 completes a circuit via the wiper arm 447 to reenergize the stepping switch coil 517 for indexably advancing the switch 445 from its fifth to its sixth position. This circuit is completed from the energized supply conductor 414, a conductor 630, a common conductor 631, the now closed contact bar of switch 300 to a common conductor 632 connected via a conductor 633 to the fifth contact, and thence via the stepping switch wiper arm 447 to the conductor 573 for energizing the stepping switch relay coil 517.

Advancement of the wiper arm 446 to its sixth position completes a circuit from energized conductor 522 to a conductor 636 which is connected to energize a relay 637 having its opposite terminal connected to a conductor 638 connected to the common conductor 460. As hereinbefore explained, the common conductor 460 extends to the wiper arm 452, now in its dotted line sixth position, for completing a circuit to the conductor 485. From the conductor 485, this circuit continues along the conductor 486 to effect energization of the solenoid 241 for effecting outward extensible movement of the tool support 51S, FIG. 8D, for moving the tool 404 carried by the tool support 403 into axial alignment with the retracted tool spindle 34. For maintaining the tool support 51S in radially extended position until the toolholder 403 is actually inserted into the spindle, the relay 637 is energized to effect a seal-in circuit upon subsequent indexable advancement of the stepping switch 445. As viewed in FIG. 9, the common conductor 460 is connected via the now closed contact 640 of the energized relay 637, and thence via a normally closed contact 642 to the energized conductor 548. For maintaining the relay 637 energized, a conductor 643 is interconnected between the conductor 636 and the conductor 460.

Upon arrival of the tool support 51S in radially extended position for axially aligning the next tool to be inserted into the spindle, FIG. 8D, it will be apparent that the associated dog 331 actuates the outer sequence control limit switch 316, FIG. 7. As viewed in FIG. 9, therefore, an energized circuit for again indexably advancing the stepping switch 445 is now completed from the energized line 414 along conductors 596, 595 and 594 to the now closed contact of actuated switch 316 to the conductor 593. From the conductor 593, this circuit then continues along a transverse branch conductor 646 connected via another conductor 647 to the sixth contact engaged by the stepping switch wiper arm 447. Therefore, since the switch 445 is in its sixth position, the circuit continues from energized conductor 647 via the stepping switch wiper arm 447 to energize conductors 573 and 515 connected to reenergize the stepping switch coil 517, as hereinbefore explained. As this occurs, the stepping switch 445 is indexably advanced from its sixth position to its seventh position, in which the function control wiper arm 446 is connected to complete an energized control circuit to a conductor 649.

The conductor 649 is connected to energize the relay 650, the latter being interconnected via a conductor 651 to the energized supply conductor 414. Energization of the relay 650 effects movement of its associated normally closed contact 614 to an open position, thereby interrupting the energized holding circuit between conductors 613 and 615 to immediately disconnect the rearward, Z axis spindle controller 616. With this circuit being thus interrupted, the Z axis rearward control relay 612 is likewise deenergized to effect movement of the associated contact 621 to open position, thereby interrupting the seal-in circuit that had been established along conductor 620. At the same time, deenergization of the rearward Z axis control relay 612 permits return movement of the other associated contact 564 to its closed position. Movement of contact 564 to closed position reestablishes an energized circuit from the energized conductor 533 to the conductor 565 for reenergizing the forward, Z axis control relay 566. Consequently, an energized circuit continues along the conductor 567 to reenergize the forward position Z axis controller 568, as hereinbefore explained. As these circuit conditions are established, the spindle head 33 is moved axially forward in a manner that the tool carried by the extended tool support 51S is inserted into the tool spindle 34, as shown in FIG. 8E.

Upon tool inserting movement of the spindle head 33 from the position represented in FIG. 8D to that represented in FIG. 8E, it will be apparent that the switch 395, FIG. 7, is deactuated and then reactuated via movement of the dog 393 into engagement with the actuating plunger thereof. Thereupon the stepping switch 445, FIG. 9, is indexably advanced from its seventh to its eighth positions. To accomplish this, a control circuit is reestablished from energized conductor 414 along a conductor 655, via a now closed contact 656 of the reactuated switch 395 to a conductor 657 connected to the seventh stepping switch contact and thence via the wiper arm 447 to complete a circuit for energizing the coil 517 to effect indexable advancement of the stepping switch to its next, or eighth position.

Upon movement of the wiper arm 446 into its eighth position, an energized circuit is established along a conductor 660 to one terminal of the relay coil 661 having its opposite terminal connected via a conductor 662 to the energized supply conductor 414. Energization of the relay 661 effects movement of an associated normally closed contact 602 upwardly to open position, thus interrupting a seal-in circuit from the energized conductor 603 to the conductor 436, thereby effecting deenergization of the collet release solenoid 358. Upon deenergization of the collet release solenoid 358, as shown in FIG. 7, the spring 361 effects resiliently biased rightward movement of the valve spool 360 for connecting the supply line 146 to exhaust and effecting deactuation of the pressure actuated switch 362, and permitting the collet actuating spring 138 to urge the collet into gripping engagement with the tool now inserted into the spindle.

After this occurs, as shown in FIG. 9, deactuation of the pressure switch 362 permits return movement of a lower contact bar 664 associated therewith to normally closed position for completing a circuit for indexably advancing the stepping switch 435 from its eighth to ninth position. This circuit is completed from the energized line 414, along a conductor 665, the normally closed contact 664 of switch 362 to a conductor 666 and thence via the stepping switch wiper arm 447 to energize the conductor 573 for reenergizing the stepping switch coil 517. At this point in a tool change cycle, the tool inserted into the spindle is simultaneously gripped by the reactivated spindle collet and the radially extended tool support 51S, as hereinbefore described with reference to FIG. 8E. Thus, with the next required tool gripped in the spindle, the remaining step in a tool change cycle is to retract the tool support to its storage position. To accomplish this, as shown in FIG. 9, the stepping switch wiper arms 446 and 447 are advanced into their ninth positions in response to return movement of contact 664 to its normally closed position.

With the stepping switch 445 indexably advanced to its ninth position, a circuit is now completed from the energized conductor 522 via the stepping switch wiper arm 446 to a conductor 670 which is connected to effect energization of a relay 671 that is connected via a conductor 672 to the energized line 414. Energization of the relay 671 effects movement of its normally closed contact 642 to open position thereby interrupting the energized circuit to the common conductor 460. In addition, movement of the contact 642 to open position interrupts the previously established seal-in circuit via the branch interconnecting conductor 642.

Interruption of the energized circuit to the common conductor 460 operates to interrupt the energized circuit to the solenoid 241. It will be recalled that the switch wiper arms 451 and 452 are positioned in their sixth position represented by the dotted lines in FIG. 9 during this particular illustrative tool change cycle. Therefore, the common conductor 460 had been connected via the wiper arm 452 to the conductor 485 and thence along the conductor 486 to originally establish the energized condition of solenoid 241. With the solenoid 241 now deenergized, the valve spool 211 of the valve 191 is resiliently returned to its forward position for effecting retracting movement of the now empty tool support 51S to its storage position, as represented in FIGS. 7 and 8F.

Energization of the relay 671 for effecting return movement of the extended tool support 51S to retracted position likewise operates to effect the indexable advancement of the stepping switch 450 from its sixth to its seventh position in a manner to condition the control circuit for effecting the next sequential tool change cycle. To this end, energization of relay 671 effects closure of a lower contact 674 effecting completion of a circuit from the energized line 414 along conductors 672 and 675 to a conductor 676. The circuit continues from the conductor 676 to energize a relay 677, the circuit being completed to the energized conductor 670. In response to energization of the relay 677, an associated open contact 678 is moved to closed position completing a circuit from the energized conductor 414 via a conductor 681 to a conductor 682.

From the energized conductor 682, this circuit continues to effect energization of a coil 683 for the stepping switch 450, the circuit from coil 683 continuing via conductor 684 and a normally closed contact 685 to the energized conductor 523. Energization of the coil 683 effects downward movement of an indexing plunger 686 to reposition an associated pawl for effecting the next single step advancement of the switch wiper arms 451 and 452 in a well known manner. Downward movement of the index plunger 686 effects corresponding movement of a collar 687 secured thereto to compress spring 688 and corresponding downward movement of normally closed contact 685 to an open position. With the normally closed contact 685 moved to open position, the circuit to the coil 683 is interrupted in a manner that the spring 688 urges the plunger 686 upwardly to effect the next single step advancement of the wiper arms 451 and 452 from the sixth dotted positions shown in FIG. 9, to their seventh positions in preparation for the next selected tool change cycle.

With the wiper arms 451 and 452 of the stepping switch 450 indexably advanced, the stepping switch 445 is likewise indexably advanced for returning the wiper arms 446 and 447 thereof their home or solid line starting positions, as represented in FIG. 9. This circuit is completed by return movement of the tool support 51S to retracted position for operating the sequence control limit switch 301, FIGS. 7 and 9. Inasmuch as the wiper arm 447 of switch 445 is still in its ninth position, therefore, a circuit is completed from conductor 573 via the switch wiper arm 447 to a conductor 692. The circuit from conductor 692 continues to effect energization of the tool cycle complete relay 546 and continues to a conductor 693 connected along conductor 633, the common conductor 632, via the now closed switch 301 to the common conductor 631. From the conductor 631, the circuit continues along conductor 630 to the energized line 414 in a manner to effect indexable movement of the stepping switch wiper arms 446 and 447 to their home or starting position, in a position for initiating the next required tool change cycle. Energization of the relay 546 during completion of the stepping switch advancing circuit operates to effect movement of the associated normally closed contact 545 to open position, thereby interrupting the energized seal-in circuit from the energized conductors 548, 547 to the conductor 544. Interruption of this seal-in circuit effects deenergization of the relays 427, 540, 559 and 566. Deenergization of the relay 427 permits return movement of the upper three associated contacts 426 to closed position for reenergizing the spindle drive motor 117, and deenergization of the relay 540 permits movement of associated contact 550 to open position to deenergize the spindle brake solenoid 350. At the same time, deenergization of the relays 559 and 566 operate to disconnect the Y axis position controller 561 and the forward Z axis position controller 568 for resuming machine operations with the next required tool gripped in the tool spindle.

To effect bodily movement of the major movable members along the X, Y and Z axes, there is provided a tape control system schematically shown in FIG. 10. As there shown, closure of a switch 749 connects energized conductors 412 and 414 to energize conductors 750 and 751 respectively. Energized conductors 750, 751 are directly connected to energize a tape reader 752, which is operative in well known manner to transmit output signals from a coded punched tape (not shown) to an output conductor 754. The tape reader 752 is adapted to transmit digital information from moving tape (not shown) of the well-known punched type to effect movement of the major movable members, as well as supplying, where required, a signal for initiating a tool change cycle. As well known in the art, the tape reader is provided with a plurality of switches operative in binary code fashion by means of switch plungers engaging appropriately spaced holes in the punched tape, as the tape is mechanically advanced relative to the reader. From the reader 752, the conductor 754 is operable to activate a code converter 755 disposed, in turn, to convert information from the tape code to decimal code; store this information in registers in the form of sine-cosine voltage ratios (from a source not shown) for predetermined selected point-to-point positioning; and, linear voltage ratios for velocity control. In addition to converting and storing information for the X, Y and Z axes, the code converter 755 is also operative to store information in binary code form relative to the required speed of the tool spindle; and for operating the unitary tool storage and tool change means for interchanging a stored tool with a tool carried by the spindle.

To simplify the description, the three branch conductors and their error operators have respectively been designated by common numerals 759 and 760, each being followed by an appropriate letter suffix to indicate the particular movement being controlled. Conductor 759X, for example, transmits information from the trunk line 756 to activate the error operator 760X for supplying both positional and velocity control information for moving the table 18 along the X axis. The error operator 760X is operative to receive feedback information via lines 762X and 763X, the latter being respectively connected to supply feedback information as to the position of the table 18 along the X axis and the information as to the velocity of the table 18 as it is being moved along the X axis. To provide accurate position feedback information, the line 762X is connected to position indicator or reading head 765X which is secured directly to the table 18. The reading head 765X is carried for movement relative to the cooperating scale 766X secured directly to the supporting frame 16 and connected to be energized by means of supply conductors (not shown). Coaction between the reading head 765X and the scale 766X provides accurate feedback information signals for indicating the position of the table 18 along the frame 16 as it is moved to a selected position along the X axis. The cooperating reading head 765X and energizable scale 766X are schematically representative of well-known, commercially available units that are operative in the manner described to supply position feedback information.

In a similar manner, to provide feedback information as to the velocity of the table 18 as it is moved along the frame 16, the line 763X is connected to receive information from the tachometer 767X which is mechanically connected to be driven by movement of the table 18. The error operator 760X operates to produce voltage proportional to the magnitude of the error, as well as indicate the direction of position error. The voltage ratios and binary numbers stored in the code converter 755, irrespective of whether they are operative to obtain positional or velocity input signals, are compared to the corresponding voltage ratios and binary numbers from the feedback conductors connected to the error operator 760X, with motion being stopped upon the occurrence of coincidence between the feedback supply and the code converter information.

From the error operator 760X, command control information is transmitted to actuate a servo amplifier 770X which is directly connected to accurately control the velocity and extent of movement of a reversible power actuator 771X. The power actuator 771X may comprise an electric motor, or a valve controlled hydraulically actuated servo-motor 772X which is directly connected to drive the table moving translating screw 773X. The translating screw 773X, in turn, is connected to be engaged by a nut 775X directly secured to the underside of the movable table 18. The general arrangement for effecting horizontal movement of the worktable 18 along the X axis is similar to that utilized for effecting the required vertical movement of the saddle 26 along the Y axis, and horizontal movement of the spindle head 33 along the Z axis.

As schematically represented in block diagram form, in FIG. 10, the power actuator 771X is connected to drive the translating mechanism 780X, which, in turn, is directly connected to a load 781X, in this case represented by the horizontally movable table 18. Actually, the translating mechanism 780X is represented as comprising the cooperative screw 773X and the nut 775X, although any suitable equivalents may be utilized for these particular elements.

In a similar manner for effecting vertical movement of the saddle 26 along the Y axis, the servo-amplifier 770Y is connected to effect selective operation of a power actuator 771Y, the latter being connected to a translating mechanism 780Y for moving a load 781Y, in this case the saddle 26. The power actuator 771Y may comprise the servo-controlled motor 370 connected to drive the translating screw 371 that engages the nut 372 secured directly to the saddle 26. The cooperatively disposed scale 376 and reader 375 are connected via the conductor 762Y to supply positional control feedback signals to the error operator 760Y. In like manner, the power actuator 771Z is connected to the translating mechanism 780Z, connected to the load 781Z, in this case the spindle head 33. Power actuator 771Z may comprise the servo-controlled motor 384 that drives the translating screw 385 engaging the nut 386 secured to the spindle head 33.

It is to be particularly noted that tape input from the reader 752 is operative to effect both velocity and point-to-point positioning control of all members, including the table 18, spindle head 33, and saddle 26, along the X, Y, and Z axes.

In addition to the digital command information available to the major movable members, separate fixed reference volted signals are available to effect the required movement of the saddle 26 and spindle head 33 for positioning the tool spindle 34 in the required tool change station in preparation for a tool change. The tool spindle 34 is provided only with a speed control, as indicated in FIGS. 9 and 10, inasmuch as the control spindle is rotated at a selected rate for performing a machining operation. To this end, the code converter 755 is adapted to store tool change signals that are transmitted via a conductor in the trunk line 756 and thence via a branch conductor 790 to effect selective shifting of the speed change transmission 116. After the required shifting movement has been completed, a shift complete signal is transmitted via a branch conductor 791 and the trunk line 753 to advance the tape reader 752.

To initiate a tool change cycle during tape controlled operation, an appropriate tool change signal is transmitted from the code converter 755 via the trunk line 756 and a branch conductor 793 to actuate the tool change cycle start relay 442, thereby effecting closure of the normally open contact 443 in FIG. 9. Closure of the contact 443 thereshown initiates a tool change cycle, as hereinbefore explained. At the completion of the required tool change cycle, the cycle complete relay 546 is energized upon movement of the stepping switch wiper arm 447 into engagement with its ninth contact. Thereupon, during tape controlled operation, normally open contact 546, FIG. 10, is closed completing a circuit from the return branch conductor 794 and via the trunk line 753 for advancing the tape reader 752.

From the foregoing detailed explanation of the operation of the tool changing mechanism and machine tool herein set forth as a practical embodiment of the present invention, it will appear that there has been provided a greatly improved automatic machine in combination with an improved tool changing mechanism that is automatically operative to interchange preselected tools with the tool spindle.

Although the illustrative embodiments of the invention have been described in considerable detail for the purpose of fully disclosing a practical operative sturcture by means of which the invention may be practiced, it is to be understood that the particular apparatus and control system described herein are intended to be illustrative only and that the various novel characteristics of the invention may be incorporated in other structural forms without departing from the spirit and scope of the invention as defined in the subjoined claims. The principle of this invention having now been fully explained in connection with the foregoing description, I hereby claim as my invention:

1. In a machine tool;
   a vertically upstanding supporting column;
   a saddle slidably carried by said column for selective vertical movement;
   a spindle head slidably carried by said saddle for selective horizontal movement;
   a power driven tool spindle rotatably journaled in said spindle head for rotation about a horizontal axis and being adapted to carry a tool;
   a stationary tool storage magazine carried by said column and presenting a plurality of spaced apart guideways disposed in predetermined relationship to the axis of said tool spindle;
   a plurality of tool holders including at least three individual tool holders supported by said guideways for rectilinear extensible movements from a retracted tool storage position;
   releasable tool securing means respectively provided at the inner ends of said tool supports with one of said securing means being empty to receive a tool carried by said tool spindle and the other of said securing means being respectively adapted to individually store tools to be selectively and individually transferred to said spindle for operation therewith in performing subsequent machining operations;
   a plurality of hydraulic actuators respectively positioned in spaced relationship to corresponding ones of said tool holders and being respectively connected to retain said tool holders in retracted position relative to said spindle;
   power drive means connected to move said saddle and said spindle head for moving said tool spindle to a tool change position in which said tool supports are disposed in radially retracted positions relative thereto; and,
   control means connected to operate the hydraulic actuator associated with said holder having said empty tool securing means for effecting coordinate movement of said empty holder and said tool spindle for transferring a tool carried thereby to said empty tool securing means for movement therewith to radially retracted storage position, said control means being sequentially operative to operate a different preselected one of said hydraulic actuators and said power drive means to effect coordinate operation of said tool spindle and said holder associated therewith for transferring the tool therefrom to said spindle and returning the empty tool holder to radially retracted position.

2. In a machine tool;
a rotatable tool receiving spindle including selectively realeasable tool securing means, said tool spindle being carried for bodily movement to effect a tool changing operation;
a stationary tool storage magazine carried in operative proximity to said tool spindle;
a plurality of more than three individual tool supports respectively carried by said storage magazine in retracted position for selective individual movement to remove a tool from said spindle and to transfer a different preselected tool into inserted position in said spindle;
power drive means operatively connected to effect coordinate movement of an empty one of said tool supports and said spindle for removing a tool carried by said spindle and returning it to stored position in said tool support;
associated control means connected to operate said power drive means for effecting coordinate movement of a different preselected one of said tool supports and said tool spindle for effecting bodily insertion of a different preselected tool into said tool spindle; and,
means for actuating said spindle tool securing means into gripping engagement with the tool inserted into said spindle.

3. In a tool selection apparatus;
a tool spindle carried for movement from a retracted tool release position to an axially forward tool engaging position and being provided with selectively actuatable tool gripping means;
a stationary tool storage magazine having three separate tool holders carried for selected individually extensible radial movement from their individually radially retracted tool storage positions relative to said tool spindle;
power drive means operative to effect radial extensible movement of a preselected one of said tool holders for moving a tool carried thereby into axial alignment with said spindle;
second power drive means operable to effect axial forward movement of said tool spindle into tool inserted engagement with the axially aligned tool carried by said extensibly positioned tool holder;
means connected to actuate said gripping means provided in said spindle into tight clamped engagement with the inserted tool; and,
means for reversibly actuating said first drive means for effecting radial movement of said extended tool support to retracted position thereby releasing the tool now gripped by said tool spindle.

4. In a machine tool having a vertically upstanding column;
a saddle slidably carried by said column for selective vertical movement;
a spindle head slidably carried by said saddle for selective horizontal movement;
a tool receiving spindle journaled in said spindle head for rotation about a horizontal axis;
first power drive means connected to effect selective movement of said saddle and said spindle head for effecting movement of said tool spindle in a corresponding direction;
a stationary tool storage magazine secured to said column and having a plurality of tool supports slidably carried thereby for selective radial movement relative to the axis of said tool spindle;
separate tool securing means respectively carried at the inner ends of each of said tool supports;
second power drive means continuously connected to urge said tool holders to radially retracted tool storage positions to permit horizontal movement of said spindle head relative to the tool securing means respectively carried thereby for performing machining operations; and,
control means connected to actuate said first and second power drive means in coordinated relationship to effect coordinate axial movement of said tool spindle and radial extensible movement of a preselected one of said tool supports for transferring a preselected tool therefrom into operative engagement with said tool spindle and for returning the empty tool support to its radially retracted position.

5. In a machine tool;
a rotatable tool spindle including releasable tool gripping means and being carried for bodily axial movement;
a stationary tool storage magazine having a plurality of individual tool carrying supports respectively positioned in radially retracted positions relative to the axis of said spindle for individual selectively extensible movement;
first power drive means connected to move said spindle to axially retracted position and to actuate said tool gripping means to released position for receiving a tool;
tool selection drive means operable to urge a selected one of said tool holders to radially extended position for moving a tool carried thereby into axial alignment with said spindle, means responsive to arrival of the selected tool into aligned position for operating said first power drive means to move said spindle to axially forward position and to actuate said tool gripping means into clamped engagement with the preselected tool carried by said tool holder; and,
means for actuating said tool selection drive means for effecting radial retraction of said extended tool holder for releasing the preselected tool gripped by said spindle.

6. In a machine tool having a rotatable tool spindle carried for axial movement;
power operable tool receiving gripping means carried by said tool spindle;
a stationary tool storage magazine having three independently movable tool storage supports respectively positioned in spaced apart retracted tool storage positions relative to said tool spindle;
power drive means connected to drive said tool spindle and a tool carried thereby for performing a machining operation whenever said tool storage supports are positioned in their respective fully retracted tool storage positions;
reversibly operative power drive means operatively connected to effect coordinate axial movement of said tool spindle and a preselected one of said tool supports for bodily inserting the tool carried thereby into operative position within said power operable tool receiving gripping means carried by said spindle; and,
means for actuating said gripping means into tight clamped engagement with the inserted tool including means for actuating said reversibly operative power drive means for returning said now empty tool support to its storage position.

7. In a machine tool;
a rotatable tool receiving spindle including a first power drive operative to effect bodily movement of said tool spindle;
a non-indexable stationary tool storage magazine having at least three individually movable tool supports respectively provided with releasable tool securing means and a plurality of second power drives individually connected to maintain said tool supports in retracted tool storage positions;
power drive control means connected to effect selective actuation of said first power drive and one of said second power drives for effecting relative movement between a preselected one of said tool supports and said tool spindle for bodily inserting a selected tool into operative engagement with said spindle; and, tool securing means carried by said spindle actuatable to securely grip the inserted tool.

8. In a machine tool;

stationary tool storage means having three separate and individually movable tool storage supports respectively carried in retracted storage positions;

stationary guide means respectively positioned to guide said supports for extensible movement from storage position and separate reversible power translators respectively and individually connected to urge said tool storage supports to their retracted storage positions;

a rotatable tool receiving spindle; and, power drive means operative to effect relative movement between said tool spindle in combination with reversible operation of a selected one of said power translators for effecting coordinated movement of the associated one of said tool supports for transferring a tool therebetween.

References Cited by the Examiner

UNITED STATES PATENTS 3,200,492   8/1965   Lehmkuhl _____ 29—568

RICHARD H. EANES, JR., *Primary Examiner.*